Figure 24:
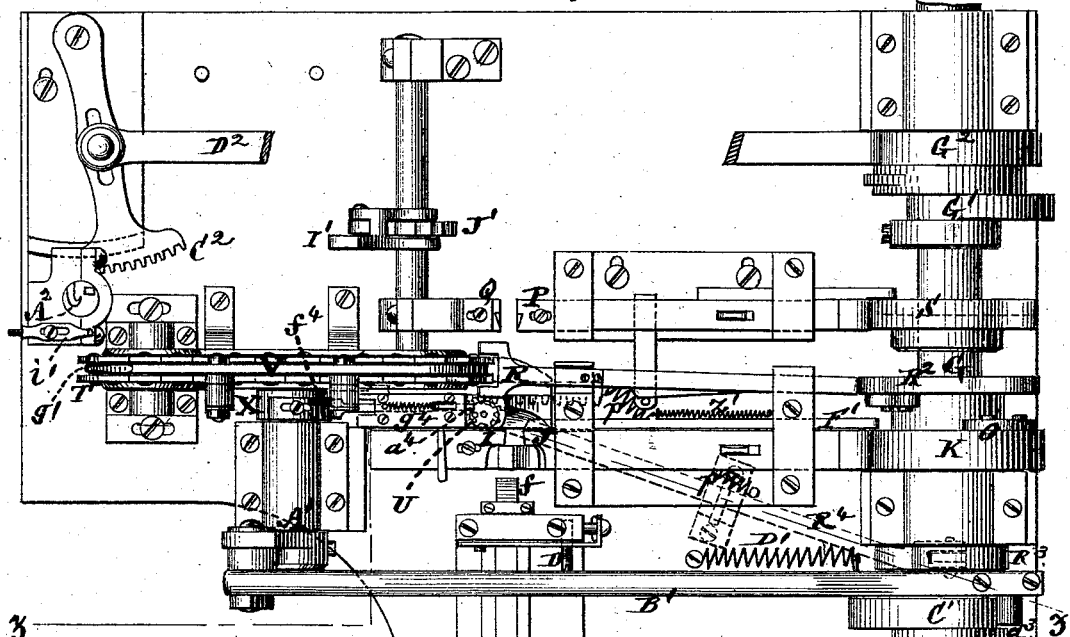

5 Sheets--Sheet 1.
J. W. COURT & C. O. CROSBY.
Machines for Making Fish-Hooks.
No. 154,228. Patented Aug. 18, 1874.
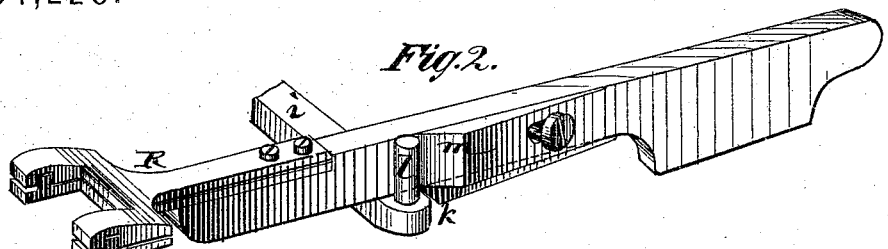
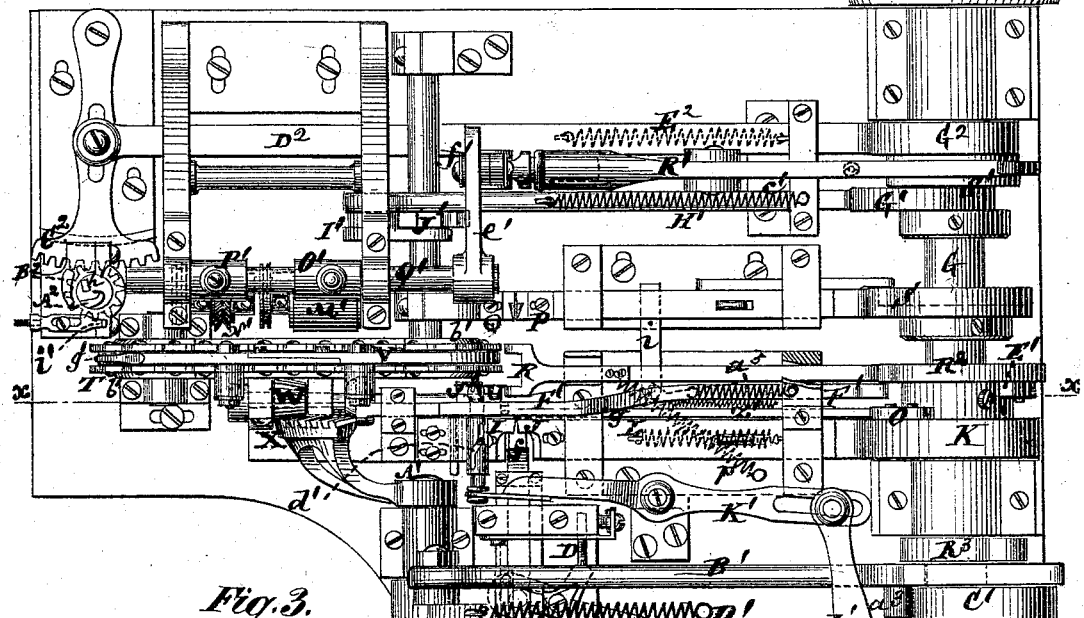
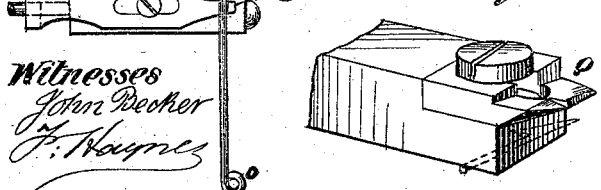
Witnesses
John Becker
F. Haynes
J. W. Court
C. O. Crosby
By their Attorneys
Thomas & Allen 5 Sheets--Sheet 2.
J. W. COURT & C. O. CROSBY.
Machines for Making Fish-Hooks.
No. 154,228. Patented Aug. 18, 1874.
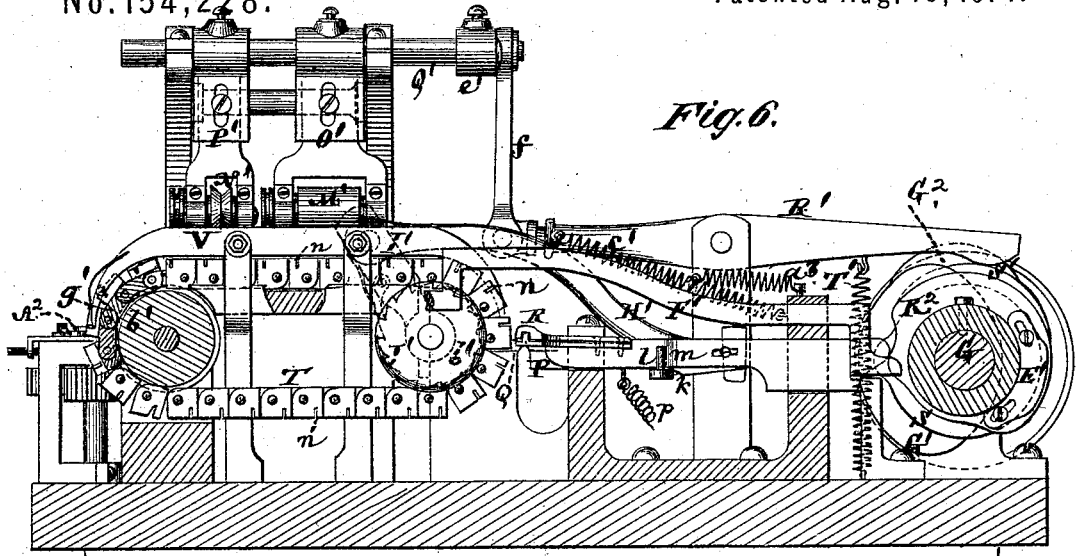
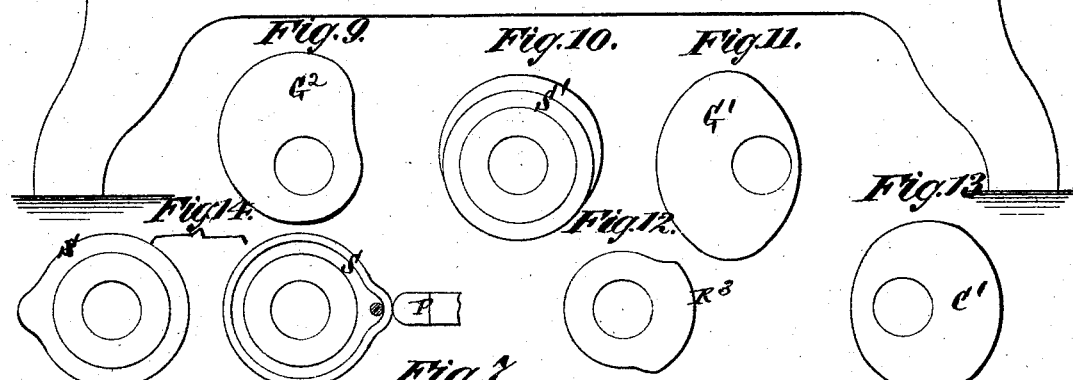
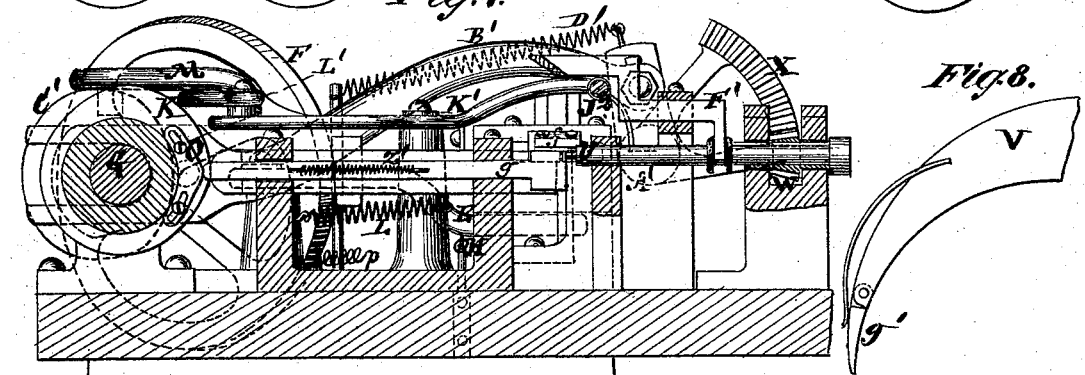

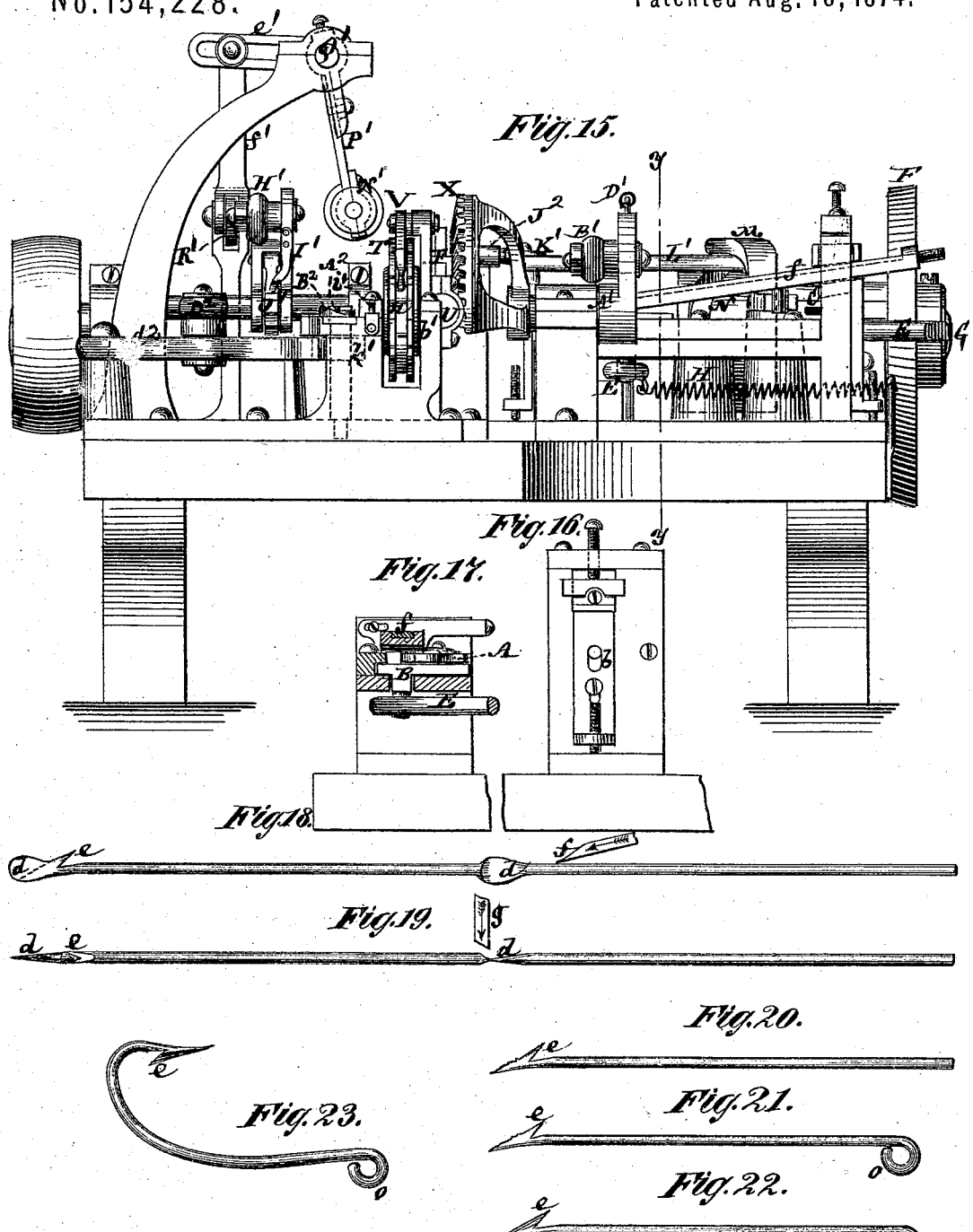
J. W. COURT & C. O. CROSBY.
Machines for Making Fish-Hooks.
No. 154,228. Patented Aug. 18, 1874.

5 Sheets--Sheet 4.

J. W. COURT & C. O. CROSBY.
Machines for Making Fish-Hooks.

No. 154,228. Patented Aug. 18, 1874.

Witnesses
John Becker
Fred. Haynes

J. W. Court
C. O. Crosby
by their Attorneys
Brown & Allen

J. W. COURT & C. O. CROSBY.
Machines for Making Fish-Hooks.

No. 154,228.

5 Sheets--Sheet 5.

Patented Aug. 18, 1874.

UNITED STATES PATENT OFFICE.

JOHN W. COURT, OF BROOKLYN, NEW YORK, AND CHAUNCEY O. CROSBY, OF MILFORD, CONNECTICUT; SAID CROSBY ASSIGNOR TO JOHN W. COURT, JOHN C. BARTON, AND R. H. ALEXANDER, OF BROOKLYN, N. Y.

IMPROVEMENT IN MACHINES FOR MAKING FISH-HOOKS.

Specification forming part of Letters Patent No. 154,228, dated August 18, 1874; application filed July 22, 1874.

*To all whom it may concern:*

Be it known that we, JOHN W. COURT, of Brooklyn, in the county of Kings and State of New York, and CHAUNCEY O. CROSBY, of Milford, in the county of New Haven and State of Connecticut, have jointly invented certain Improvements in Machines for the Manufacture of Fish-Hooks, of which the following is a specification:

This invention relates to the manufacture of fish-hooks of various kinds, including back-ring hooks, side-ring hooks, and flat-head hooks; and it consists in various novel combinations of devices whereby said articles are produced in a rapid and most perfect manner by or from a coil or continuous supply of wire. This wire is fed forward intermittingly the necessary length or distance to form a hook by a reciprocating eccentric feeding-dog controlled by a locking-up screw and liberating-screw, said feeding-dog passing the wire to or between the flatting-dies. These dies flatten the wire on opposite sides to partly form the point of the hook. The barb of the hook is cut in the wire by a special cutter, while the latter is held by the flatting-dies, after which the flattened and barbed hook-section, or piece of wire of a length sufficient to form a hook, is severed, by a cross-cutter, from the main body of the wire. While, or nearly at the same time as, the flatting and barbing of one hook-section is being performed, as above mentioned, and before the severing or cutting off of the previously flattened and barbed hook-section, the last-mentioned hook-section, which has been carried forward by the feeding forward of the wire, is subjected to the action of trimming-dies, by which its flattened portion is cut to shape to produce the point of the hook. After the hook-section has been thus trimmed at its point, and severed from the wire in the rear, it is taken hold of it by a transferrer, which moves it out of the way of the next feed of the wire and puts it into a notched carrying-chain and under a holding-bar arranged over the latter, such action also bringing the rear end of the hook in proper relation with a ringer, which forms the ring at its back end. A turning device then comes into operation in the machine to turn the hook, with its barb, upward for the purpose of passing the latter under and between swinging rotary mills during the intermittent movements of the carrying-chain, said mills milling both the point and barb. The hook, afterward passing from under a flexible extremity of the holding-bar, is caught by, or delivered onto, a bender, which shapes the hook, and which is provided with a discharger for throwing off the made hook. When what is known as a side-ring hook is to be produced, a reciprocating depresser also may be used to crook the wire in rear of the ring and below it. To form flat-head hooks, the ringer is dispensed with, also the cross-cutter hereinbefore referred to, and there are substituted for them dies operating to form the flat head, such dies also serving to cut or shear off one hook-section from the next one in rear of it.

In the accompanying drawing, Figure 1 is a plan of the machine with its parts as arranged for making back-ring hooks, and showing, in its advance position, an eccentric, which moves the wire-feeding device forward. Fig. 2 is a perspective view, upon a larger scale, of the transferrer; Fig. 3, a plan, also on a larger scale, of the bending device; Figs. 4 and 5, a view in perspective, and front-end view, likewise, on a larger scale, of one of the trimming-cutters. Figs. 6 and 7 are vertical sections of the machine on the line $x$ $x$ in Fig. 1, looking in reverse directions. Fig. 8 is a side view, on a larger scale, of the flexible extremity of the holding-bar, used in connection with the carrying-chain. Figs. 9, 10, 11, 12, and 13 are side views, looking from the front or feeding end of the machine, of certain cams used in the latter; Fig. 14, also reverse-side views of another cam for working the movable trimming-cutter. Fig. 15 is a side or end view of the machine at right angles to Figs. 6 and 7. Fig. 16 is a front or face view of the frame of the feeding device, through which the wire is introduced. Fig. 17, a vertical section, in part, through the line $y$ $y$. Fig. 18 is a longitudinal side view, and Fig. 19 a plan, of the wire in different stages of progress, together with cutters for barbing and dividing the flattened wire. Figs.

Figures 25, 26:
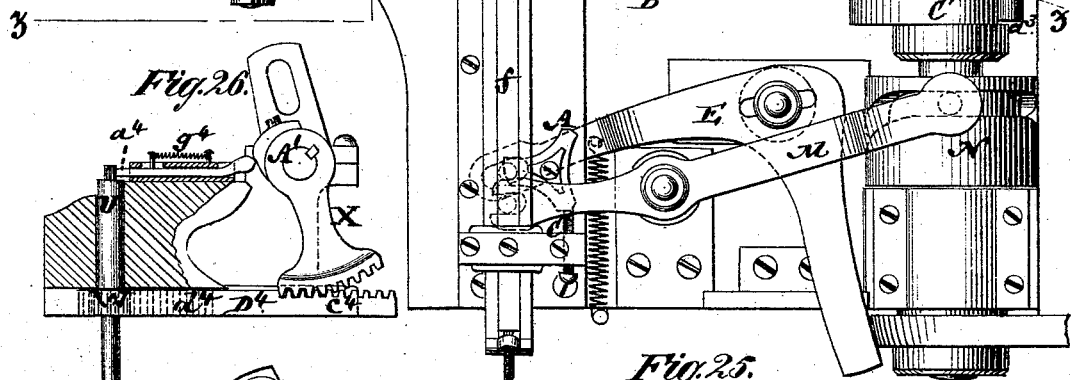
Figure 27:
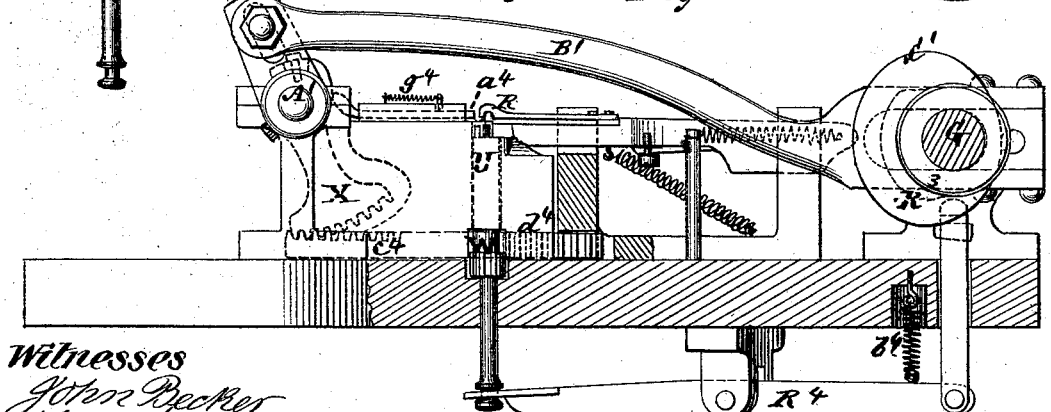
Figure 28:
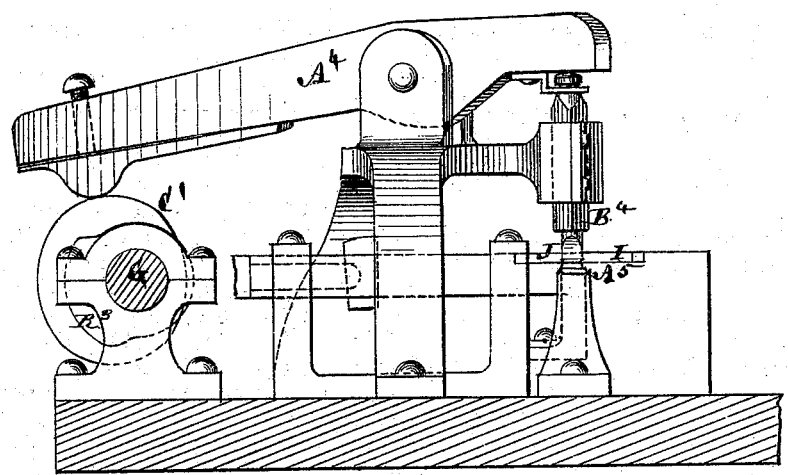
Figure 29:
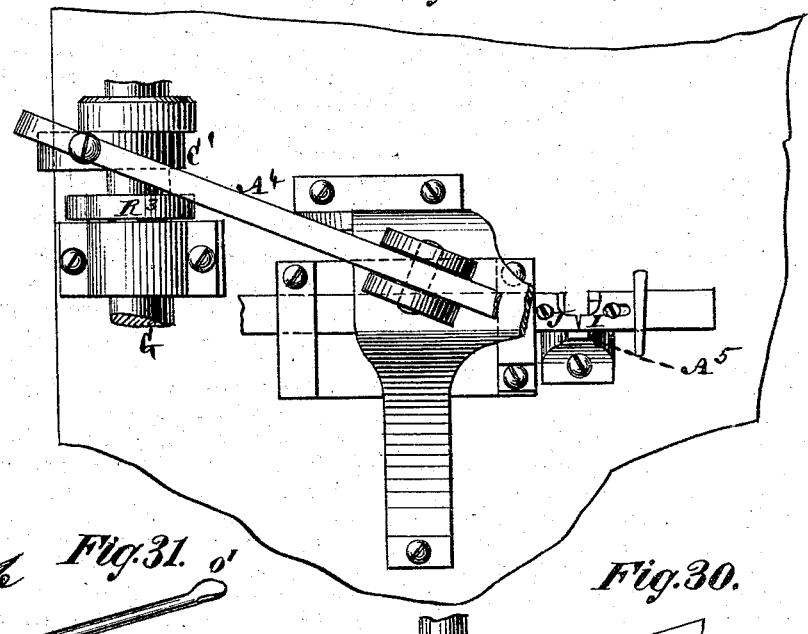
Figures 30, 31:
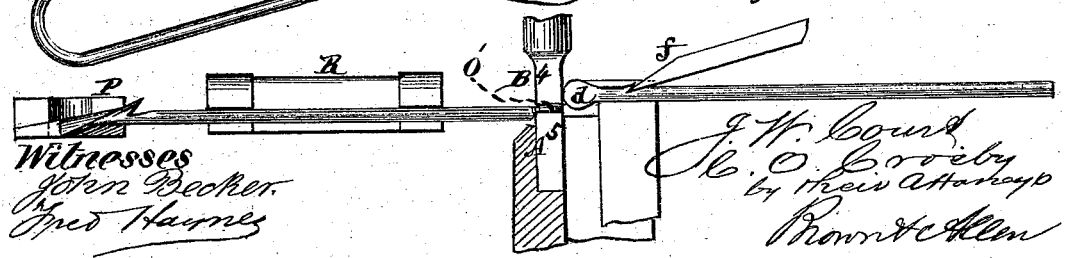

20, 21, and 22, longitudinal views of the hook or wire forming the same, during different stages of its construction. Fig. 23 is a side view of a finished back-ring hook. Fig. 24 is a plan, in part, of the machine as constructed to make side-ring hooks, with the milling-tools and other parts removed, and with the eccentric which moves the feeding device in its retired position. Fig. 25 is an irregular vertical section on the line $z\,z$ in Fig. 24. Fig. 26 is a partly-sectional front view of the ringing device, detached for making side-ring hooks. Fig. 27 is a view in perspective of a side-ring hook. Fig. 28 is a side elevation of a device used in connection with the machine for making flat-head hooks, the same being a substitute for the ringer. Fig. 29 is a plan of said device, with the upper die and part of its operating-lever removed. Fig. 30 is a longitudinal elevation of certain devices for making flat-head hooks, and Fig. 31 is a perspective view of a flat-head hook, as made by the machine.

Referring, in the first instance, from Figs. 1 to 23, inclusive, the wire, which may be supplied from a reel or otherwise, is first fed through or between straightening-rollers (not shown in the drawings) to a wire-feeding device, which mainly consists of an eccentric feeding-dog, A, to which the wire is introduced through an opening, $b$, shown in Fig. 16, said dog being pivoted to and carried by a reciprocating carriage or slide, B, which receives its motion alternately toward and from screws C D, by means of a bell-cranked lever, E, operated, as regards giving a forward movement to the carriage B, through an eccentric, F, on the main shaft G, and through or by a spring, H, as regards the backward movement of said carriage. The lever E has its fulcrum $c$ in a slot, which, without altering the throw of the eccentric F, provides for giving a variable general length of feed to the wire, according to the length of hook required. A more accurate adjustment in this respect, also the proper action of the eccentric feeding-dog A, as regards its lock and liberation of the wire at the beginning and end of each intermittent feed, is obtained by means of the locking-up screw C, against which the dog A strikes when completing its back stroke, and a liberating-screw, D, against which said dog strikes at the end of its forward stroke, or that of the slide B carrying it. Each intermittent feed of the wire projects the latter the necessary distance through or between flatting-dies I J, which also may be holding-dies to retain the fed wire in position when the eccentric feeding-dog A moves back. The one, I, of these flatting-dies may be stationary and the other, J, movable. These dies serve, as the wire is successively or intermittingly advanced by the eccentric feeding-dog A, to form a succession of flats, $d$, Figs. 18 and 19, and during such operation to hold on the wire while the eccentric feeding-dog, after it has been released by the liberating-screw D, makes its back movement, or special holding devices may be used to hold on to the wire during the back action of the eccentric feeding-dog A. The movable flatting-die J is moved and held forward at the proper time, and for the requisite interval, relatively to the stationary flatting-die I, to produce the flat $d$, by means of a cam, K, on the main shaft G, and said movable die J is returned and kept in contact by its backward extension with the operating-cam K by a spring, L. The wire having been fed forward and flattened, as described, the same, as it is held by the flatting-dies I J, has its barb $e$ cut in it by means of an oblique cutter, $f$, which receives its motion by or from a lever, M, through a cam, N, on the main shaft G. After this a cross-cutter, $g$, having an intermittent reciprocating action is projected forward to divide the wire at the advance end of its flattened portion, as shown in Fig. 10, such action being produced by a cam or projection, O, on the side of the cam K, as against a spring, Z, which draws said cutter back. Supposing, however, the wire to have received, say, two feeds at starting, (the first operation being a lost one,) so as to pass the wire into or between trimming-dies P Q, and supposing the wire to have been previously flattened and barbed, as described—which action and preliminary feed of the wire will best describe the general operation—then the trimming-dies P Q (and before the wire is severed by the cross-cutter $g$ into a length necessary to form a hook) first act upon the advance end of the wire or forward flatted portion $d$ to trim or cut off the flat $d$ in line with the barb $e$, as shown by dotted line at the left hand of Fig. 18. But it should here be observed that as the wire is fed into or between the trimming-dies P Q it is passed under or free of a transferrer, R, having a forward motion given it by a cam, $R^2$. The trimming-dies P Q, the one, Q, of which is stationary and the other one, P, movable, are constructed substantially as represented in Figs. 4 and 5, only the one being right hand and the other left-hand, as it were. The movable trimming-cutter P receives its forward and back motion by means of an outside and inside cam, S, on the shaft G. After the wire or advance flatted portion $d$ has been trimmed, as described, then the traveling trimming-die P moves back and the transferrer R, which is formed with griping-jaws at its forward end, as more clearly shown in Fig. 2, and may be supposed to occupy a back position, moves forward to take hold of the wire between the flatting-dies I J and the trimming-dies P Q. The cross-cutter $g$ then acts to sever the wire, and the transferrer R, holding the severed portion or embryo hook in its jaws, is lifted, by a projection, $i$, on the movable trimming-die P coming under an incline, $k$, on the lower surface of the transferrer, to place the transferrer and severed wire section or embryo hook which it holds out of the way of the next advance feed of the flatted and barbed wire into the trimming-dies P Q. Simultaneously with this lift of the transferrer R, or after its lift has been effected, and while it continues raised and is moving forward, a pin, $l$, on the projection $i$ of the movable trimming-die P, during the back motion of the latter, acts upon a side incline, $m$, of the transferrer, by or during the continued forward motion of the latter, to put the trimmed hook carried by the transferrer into cross-notches $n$ of an endless carrying-chain, T, to bring the rear portion of the embryo hook, which then assumes the form shown in Fig. 20 of the drawing, in line with a pronged ringer, U, that not only has a forward and backward movement but also a partially rotating one, for the purpose of turning or forming the ring $o$ in the back end of the embryo hook, while the latter is held in the one set of cross-notches $n$, under the forward end of an upper holding-bar, V, the ringer U then occupying an advance position. The hook having been ringed, the ringer U then slides backward to take its prongs out of the ring $o$, the transferrer R meantime remaining stationary till the ring is formed. After this, the upper line of the carrying-chain T moves forward to take the ringed but embryo hook out of the transferrer R and pass it under the holding-bar V. The transferrer R then moves back and to one side, in proximity to the flatting-dies I J, by means of a spring, $p$, to, in due course, repeat its action as before. The ringer U has its necessary turning motion communicated to it by means of a bevel-pinion, W, and toothed sector X, said pinion being in feathered gear with the sliding and rotating ringer, and the toothed sector X being operated by its connection with a crank-shaft, $A^1$, which is vibrated alternately in opposite directions, as required, by a yoke, rod, or lever, $B^1$, actuated by a cam or eccentric, $C^1$, on the shaft G, against a pin, $a^3$, and a spring, $D^1$, combined. The requisite intermittent forward and backward movement of the ringer N is effected by the alternate action of a cam, $E^1$, on the shaft G, and a spring, $a^5$, upon a sliding rod, $F^1$, connected with the ringer U. The motion of the endless carrying-chain T, which travels round end pulleys $b^1$ $b^1$, is also intermittent, such motion being derived from a cam, $G^1$, on the shaft G, acting against a rod, $H^1$, which is pivoted at its forward end to a pawl lever, $I'$, that actuates a ratchet, $J^1$, on the shaft of one of the pulleys $b^1$. This gives the forward motion, at intervals, of the carrying-chain T, a spring, $c^1$, serving to return the pawl-lever $I'$ and rod $H'$ to their normal position, for a succeeding action, in due course, by the cam $G^1$.

What has been described for the action of the several parts as regards their formation of one embryo hook applies equally to their action as regards the production of successive hooks, and as each embryo hook, after it has been deposited by the transferrer R within its respective cross-notches $n$ of the carrying-chain T, and had the ring $o$ formed in it, is carried forward under the holding-bar V, it is brought by the intermittent action of the carrying-chain opposite a notched turning device, $J^2$, which occupies a lateral position relatively with the upper line of travel of the chain, and is projected forward or in toward said chain, and at the same time partially rotated on its axis, to take hold of the ring $o$ of the embryo hook and turn the latter with its barb $e$ upward, and hold it in such position by forcing the ring $o$ of the hook into the notches $n$, or countersunk edges of them, on the one side of the chain. The notched turning device $J^2$ is thus operated, and afterward returned to its normal position, by a lever, $K'$, and rod $L'$, connected with the lever M, which combination gives the necessary straight or reciprocating sliding action to the turning device $J^2$, that has its requisite turning motion given it, first in one direction and then in the other, accordingly as it is projected forward or backward by a pin on its shank arranged to travel within a spiral groove, $d^1$, in a sleeve within which the stock or shank of the turning device $J^2$ slides, as shown in Fig. 1.

The object of thus arranging and securing the retention of the embryo hook within the carrying-chain, with its barb $e$ upward, is to effect the filing of the barb by means of swinging rotary mills $M'$ $N'$, constructed to successively file the top and sides of the barb $e$, as said hook, by the intermittent action of the carrying-chain, is brought opposite the mills, which receive independent rotary motions by means of pulleys on their shafts, and are swung first forward and then backward in a lateral direction relatively to the carrying-chain, by their attachment to hangers $O'$ $P'$, fast to a rocking shaft, $Q'$, which is vibrated by means of a slotted crank or lever, $e^1$, a rod, $f^1$, a lever, $R^1$, and an eccentric, $S'$, on the main shaft G, as against a spring, $T'$.

As each embryo hook, after it has thus been prepared, is passed, by the intermittent action of the carrying-chain T, under the holding-bar V, it finally reaches a flexible or jointed and spring-held extremity, $g^1$, of the latter, which provides for its removal from the carrying-chain, as the barb $e$ of the hook, by the action of said chain, is brought down and within or over a curvilinearly-reciprocating hooked bender, $A^2$, with its back supported by a rest, $h'$, on the base or disk which carries the bender, and with the back edge of the body of the hook resting against a fixed adjustable stop, $i'$. (See more particularly Fig. 3, also Fig. 1, of the drawing.) The bender $A^2$ or disk carrying it, and which forms a part thereof, is then turned in direction of the arrow $x'$ in Fig. 3, which causes the embryo hook to be bent around the back of the bender $A^2$, so as to cause the hook to assume the form shown in Fig. 23, after which the bent hook, in the back curvilinear action of the bender $A^2$, is passed over an inclined discharger, $B^2$, and jerked out of or delivered from the machine ready for polishing or further dressing, as required. The necessary and timely action of the bender $A^2$ is produced by a reciprocating toothed sector, $C^2$, in gear with a pinion, $k'$, connected with the axis of the bender, said toothed sector receiving its motion first in the one direction and then in the other by means of a slide or rod, $D^2$, a spring, $E^2$, pulling back on said rod, and a cam, $G^2$, on the main shaft G.

When it is desired to have the ring $o$ of the hook occupy a lateral instead of a back position, or, in other words, to produce a side ring, as shown in Fig. 27, then it will be necessary to modify certain of the details, as shown in Figs. 24, 25, and 26 of the drawing. Thus, instead of the pronged ringer U occupying a horizontal position, as in the several figures herein previously described, it is arranged vertically between the flatting-dies I J and the forward end of the carrying-chain T, and in like relation with the transferrer R. The action, however, as regards ringing the hook is the same—for instance, after the trimmed hook has been carried by the transferrer into the cross-notches $n$ of the carrying-chain T, and its rear portion brought over the pronged ringer U, Figs. 24, 25, and 26, said ringer U is moved upward to enable its prong to clip or grasp the wire in between them, after which the ringer is partly rotated to form the ring, and simultaneously or thereabout with such action an intermittingly reciprocating horizontal depresser, $a^4$, comes forward to crook the wire at the back of the ring or, rather, body of the hook adjacent to the ring, for the purpose of throwing the ring in central position with the stem or body. Such depresser $a^4$ then retires; also, the ringer U descends out of the way, to leave the hook at liberty for further action, as hereinbefore described with reference to the back-ring hook, and to put the ringer U and depresser $a^4$ in their normal positions for further action on a succeeding hook. The necessary up-and-down movement of the ringer U in Figs. 24, 25, and 26 is effected by the joint action of a cam, $R^3$, Figs. 12, 24, and 25, on the shaft G, arranged to depress the one end of a lever, $R^4$, which operates at the other end to lift the ringer U, while a spring, $b^4$, serves, in due course, to depress it. The turning of the ringer U alternately in reverse directions is effected by the cam $C^1$ acting in the rear instead of in the front on a pin, $a^3$, of the yoke rod or lever $B^1$, as against the spring $D^1$, to give an intermittent reciprocating motion to the crank-shaft $A^1$ having attached to it the toothed sector X, which gears with a rack, $c^4$, of a sliding bar, $D^4$, that, by means of a further rack, $d^4$, on it, operates the pinion W of the ringer. The depresser $a^4$, which gives the crook $e^4$ in the back of the hook near the ring, is actuated by the combined action of a cam, $f^4$, on the crank-shaft, $A^1$ and a spring, $g^4$.

When it is desired to form flat-head hooks, as represented in Fig. 31 of the drawing, then a modification, substantially as represented in Figs. 28, 29, and 30 of the drawing, is used in place of the ringer and other appertaining devices. Thus, after the barb has been cut by the barb-cutter $f$ and the flatting-dies I J have formed the flat $d$ in the wire, instead of the ringing devices hereinbefore described and the cross-cutter for separating the hook-sections being used, the cam $C^1$ on the main shaft G is caused to operate a lever, $A^4$, and bring down a top die or punch, $B^4$, against a lower fixed die, $A^5$, after the flatting-dies have ceased to operate. This not only shears off the one hook-section from the next one in rear of it, leaving the previous hook-section for operation by the transferrer R and trimming-dies, as hereinbefore described, but forms the flat head $o'$ on the hook, as represented in Figs. 30 and 31 of the drawing, other actions or operations being similar to those hereinbefore described.

I claim—

1. The wire-feeding device consisting of the eccentric feeding-dog A, in combination with the locking-up screw C and liberating-screw D, substantially as herein described.

2. The combination, as herein described and shown, of the feeding device A, flattening and holding dies I J, and the barb-cutter $f$, substantially as and for the purpose specified.

3. The trimming-cutters P Q, in combination with the transferrer R and wire-feeding device A, substantially as herein set forth.

4. The transferrer R, in combination with the flatting and holding dies I J and the ringing device U, substantially as herein described.

5. The combination of the transferrer R and the trimming-cutters P Q, substantially as herein described.

6. The transferrer R, in combination with the notched carrying-chain T, substantially as herein specified.

7. The turning device $J^2$, in combination with the notched carrying-chain T, substantially as herein described.

8. The combination of the notched carrying-chain T, turning device $J^2$, and swinging rotary mills M' N', substantially as herein described.

9. The flexible extremity $g^1$ of the holding-bar V, in combination with the notched carrying-chain T, substantially as and for the purpose herein set forth.

10. The combination of the notched carrying-chain T, bender $A^2$, and discharger $B^2$, substantially as herein specified.

11. The combination of the discharger $B^2$ and the bender $A^2$, substantially as herein specified.

J. W. COURT.
C. O. CROSBY.

Witnesses:
MICHAEL RYAN,
VERNON H. HARRIS.